United States Patent
Zhao et al.

(10) Patent No.: US 10,339,633 B2
(45) Date of Patent: Jul. 2, 2019

(54) METHOD AND DEVICE FOR SUPER-RESOLUTION IMAGE RECONSTRUCTION BASED ON DICTIONARY MATCHING

(71) Applicant: Peking University Shenzhen Graduate School, Shenzhen (CN)

(72) Inventors: Yang Zhao, Shenzhen (CN); Ronggang Wang, Shenzhen (CN); Wen Gao, Shenzhen (CN); Zhenyu Wang, Shenzhen (CN); Wenmin Wang, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 0 days.

(21) Appl. No.: 15/749,554

(22) PCT Filed: Nov. 4, 2015

(86) PCT No.: PCT/CN2015/093765
§ 371 (c)(1),
(2) Date: Feb. 1, 2018

(87) PCT Pub. No.: WO2017/075768
PCT Pub. Date: May 11, 2017

(65) Prior Publication Data
US 2018/0232857 A1    Aug. 16, 2018

(51) Int. Cl.
*G06T 3/40* (2006.01)
*G06K 9/46* (2006.01)
*G06K 9/62* (2006.01)

(52) U.S. Cl.
CPC .......... *G06T 3/4053* (2013.01); *G06K 9/4628* (2013.01); *G06K 9/6215* (2013.01);
(Continued)

(58) Field of Classification Search
None
See application file for complete search history.

(56) References Cited

PUBLICATIONS

Zhang et al. "Image Super-resolution via Dual-dictionary learning and sparse representation", International Symposium on Circuits and System, IEEE 2012 (Year:2012).*

(Continued)

*Primary Examiner* — Yingchun He
(74) *Attorney, Agent, or Firm* — SV Patent Service (57) ABSTRACT

The present application provides a method and a device for super-resolution image reconstruction based on dictionary matching. The method includes: establishing a matching dictionary library; inputting an image to be reconstructed into a multi-layer linear filter network; extracting a local characteristic of the image to be reconstructed; searching the matching dictionary library for a local characteristic of a low-resolution image block having the highest similarity with the local characteristic of the image to be reconstructed; searching the matching dictionary library for a residual of a combined sample where the local characteristic of the low-resolution image block with the highest similarity is located; performing interpolation amplification on the local characteristic of the low-resolution image block having the highest similarity; and adding the residual to a result of the interpolation amplification to obtain a reconstructed high-resolution image block. The local characteristics of the image to be reconstructed extracted by the multi-layer linear filter network have higher precision. Thus, a higher matching degree can be obtained during subsequent matching with the matching dictionary library, and the reconstructed image has a better quality. Therefore, the present invention can greatly improve the quality of the high-resolution image to be reconstructed.

5 Claims, 5 Drawing Sheets

(52) U.S. Cl.
CPC ......... *G06K 9/6255* (2013.01); *G06K 9/6273* (2013.01); *G06T 3/4007* (2013.01)

(56) References Cited

PUBLICATIONS

Bevilacqua et al. "Single-Image super-resolution via linear mapping of interpolated self-examples", IEEE Transactions of Image Processing, vol. 23 No. 12 Dec. 2014 (Year:2014).*

* cited by examiner

METHOD AND DEVICE FOR SUPER-RESOLUTION IMAGE RECONSTRUCTION BASED ON DICTIONARY MATCHING

TECHNICAL FIELD

The present invention relates to a method and a device for super-resolution image reconstruction based on dictionary matching.

BACKGROUND OF THE INVENTION

Super-resolution is also known as up-sampling and image magnification, which refers to recovering a high-resolution image from a low-resolution image. Super-resolution is one of the basic operations in image and video processing, with wide application prospect in the fields of medical image processing, image recognition, digital photo processing, high-definition television, etc.

One of the most common super-resolution algorithms is kernel-based interpolation algorithm, such as bilinear interpolation, spline interpolation, and so on. However, the interpolation algorithm generates continuous data by using known discrete data, blurring, jagging, and other problems may occur and the effect of image restoration is not good.

In recent years, a large number of image edge-based super-resolution algorithms have been put forward to improve the unnatural effects of images reconstructed by using traditional interpolation algorithms and improve the visual quality of edge of reconstructed images. However, this type of algorithm focuses on improving the edges and cannot recover high-frequency texture details. To solve the problem of high-frequency detail reconstruction, some dictionary learning methods have been put forward, which use the existing high-resolution image blocks to train the high-resolution dictionary corresponding to the low resolution, and then use the high-resolution dictionary to recover the lost details in the low-resolution image. However, in the traditional methods that use dictionaries to recover high-resolution images, the accuracy of matching affects the quality and the effect of the image reconstruction because the dictionary needs to be matched with the low-resolution images. Therefore, improving matching accuracy and the reconstruction quality of low-resolution images becomes a key research direction in the field of image processing.

SUMMARY OF THE INVENTION

The present invention provides a method and a device for super-resolution image reconstruction based on dictionary matching, which can improve the quality of the reconstructed high-resolution image.

According to an aspect of the present invention, the present application provides a method for super-resolution image reconstruction based on dictionary matching, comprising the steps of: establishing a matching dictionary library; inputting an image block to be reconstructed into a multi-layer linear filter network, and extracting a local characteristic of the image block to be reconstructed; searching the matching dictionary library for a local characteristic of a low-resolution image block having the highest similarity with the local characteristic of the image to be reconstructed; searching the matching dictionary library for a residual of a combined sample in which the local characteristic of the low-resolution image block with the highest similarity is located; performing interpolation amplification on the local characteristic of the low-resolution image block having the highest similarity, and adding the residual to a result of the interpolation amplification to obtain a reconstructed high-resolution image block.

According to another aspect of the present invention, the present application provides a device for super-resolution image reconstruction based on dictionary matching, comprising: an establishing unit that can establish a matching dictionary library; an extracting unit that can input an image block to be reconstructed into a multi-layer linear filter network, and extracting a local characteristic of the image block to be reconstructed; a matching unit that can search the matching dictionary library for a local characteristic of a low-resolution image block having the highest similarity with the local characteristic of the image to be reconstructed; a searching unit that can search the matching dictionary library for a residual of a combined sample in which the local characteristic of the low-resolution image block with the highest similarity is located; a difference amplification unit that can perform interpolation amplification on the local characteristic of the low-resolution image block having the highest similarity; a reconstruction unit that can add the local characteristic of the low-resolution image block amplified by the difference amplification unit and the residual found by the searching unit to obtain a reconstructed high-resolution image block.

The present application provides a method and a device for a super-resolution image reconstruction based on dictionary matching. The method includes: establishing a matching dictionary library; inputting an image to be reconstructed into a multi-layer linear filter network; extracting a local characteristic of the image to be reconstructed; searching the matching dictionary library for a local characteristic of a low-resolution image block having the highest similarity with the local characteristic of the image to be reconstructed; searching the matching dictionary library for a residual of a combined sample in which the local characteristic of the low-resolution image block with the highest similarity is located; performing interpolation amplification on the local characteristic of the low-resolution image block having the highest similarity; and adding the residual to the interpolation amplification result to obtain a reconstructed high-resolution image block. The local characteristic of the image to be reconstructed extracted by the multi-layer linear filter network has higher precision. Thus, a higher matching degree can be obtained during subsequent matching with the matching dictionary library, and the reconstructed image has a better quality. Therefore, the present invention can greatly improve the quality of the high-resolution image to be reconstructed.

DETAILED DESCRIPTION OF THE INVENTION

A method and a device for super-resolution image reconstruction based on dictionary matching are provided according to the present invention, which can increase quality of the reconstructed high-resolution image.

The present invention is further described below in details by using specific embodiments with reference to the attached schematic drawings.

Figure 1:
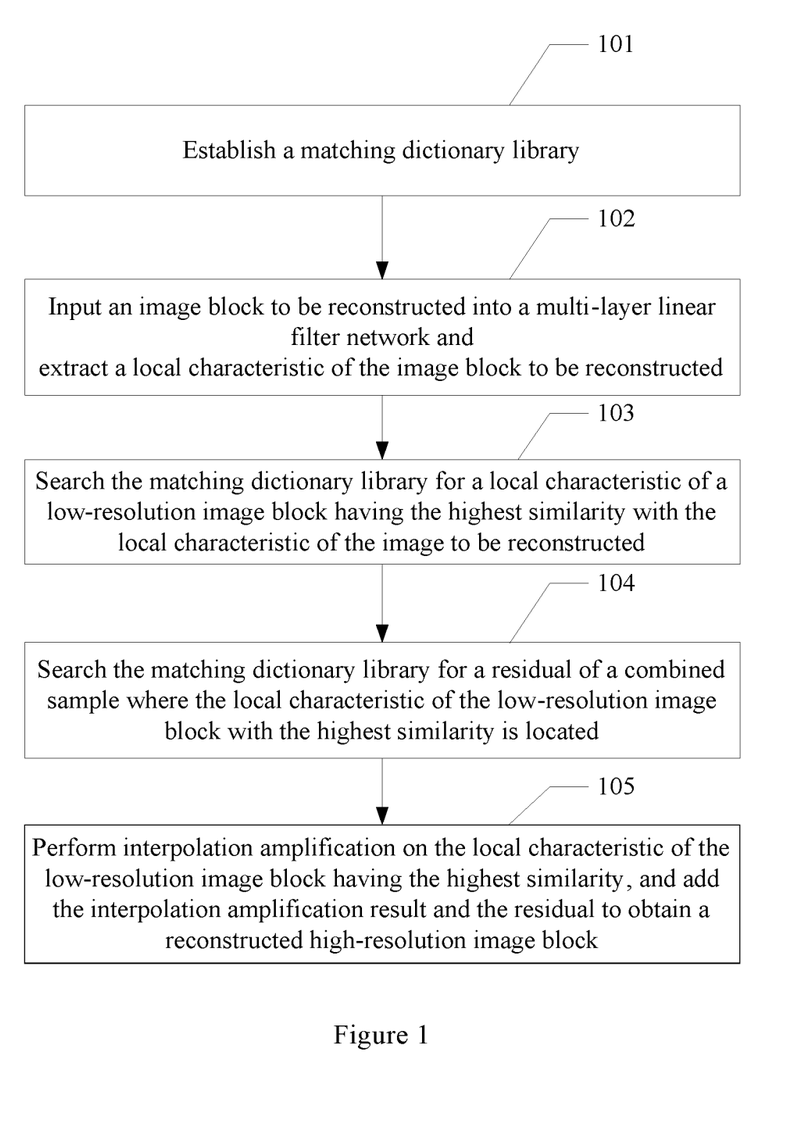
FIG. 1 is a flowchart for a method for super-resolution image reconstruction based on dictionary matching.

Implementation Example 1:

FIG. 1 illustrates a flowchart for a method for the Implementation Example 1. The method of super-resolution image reconstruction based on dictionary matching includes:

Step 101: establishing a matching dictionary library.

Step 102: inputting an image block to be reconstructed into a multi-layer linear filter network, and extracting a local characteristic of the image block to be reconstructed.

In particular, Step 102 includes the steps of:

Step 1: A multi-layer linear filter network comprises a filter layer. The first-stage filter of the filter layer filters the input image block to be reconstructed by using N linear filter windows with different sizes to obtain corresponding N filtered images and output to the next stage filter, wherein the filtered image includes a line characteristic of the image, where N is an integer greater than one.

Step 2: The second-stage filter of the filter layer filters the N filtered images output from the first-stage filter by using M linear filter windows with different sizes to obtain corresponding M×N filtered images, where M is an integer greater than one.

Step 3: outputting all the filtered images obtained by each stage filter to the next stage filter repeatedly. The next stage filter filters all filtered images output from the previous stage filter by using multiple linear filter windows with different sizes, until filtering by the last stage filter is completed. All filtered images are output to the mapping layer of the multi-layer linear filter network.

Step 4: The mapping layer performs binarization on all the filtered images of the filter layer and outputs them to the output layer of the multi-layer linear filter network.

Step 5: The output layer concatenates and outputs the binarized filtered image output by the mapping layer, to obtain a local characteristic of the input image block to be reconstructed.

The local characteristic of the image block to be reconstructed extracted by the multi-layer linear filter network has higher precision. Thus, a higher matching degree can be obtained during subsequent matching with the matching dictionary library, and the reconstructed image has a better quality. The extraction of image features through the multi-layer linear filter network according to some embodiments in the present invention is also applicable to a reconstruction method based on manifold learning or sparse representation.

Step 103: searching the matching dictionary library for a local characteristic of a low-resolution image block having the highest similarity with the local characteristic of the image to be reconstructed.

Step 104: searching the matching dictionary library for a residual of a combined sample where the local characteristic of the low-resolution image block with the highest similarity is located.

Step 105: performing interpolation amplification on the local characteristic of the low-resolution image block having the highest similarity, and adding the interpolation amplification result and the residual to obtain a reconstructed high-resolution image block.

It can be understood that if we need to perform the super-resolution reconstruction on the entire image by using the disclosed method, only a plurality of low-resolution images to be reconstructed constituting the whole image are respectively reconstructed into high-resolution image blocks according to the above steps. Then all reconstructed high-resolution image blocks are concatenated to obtain a reconstructed high-resolution image.

Figure 2:
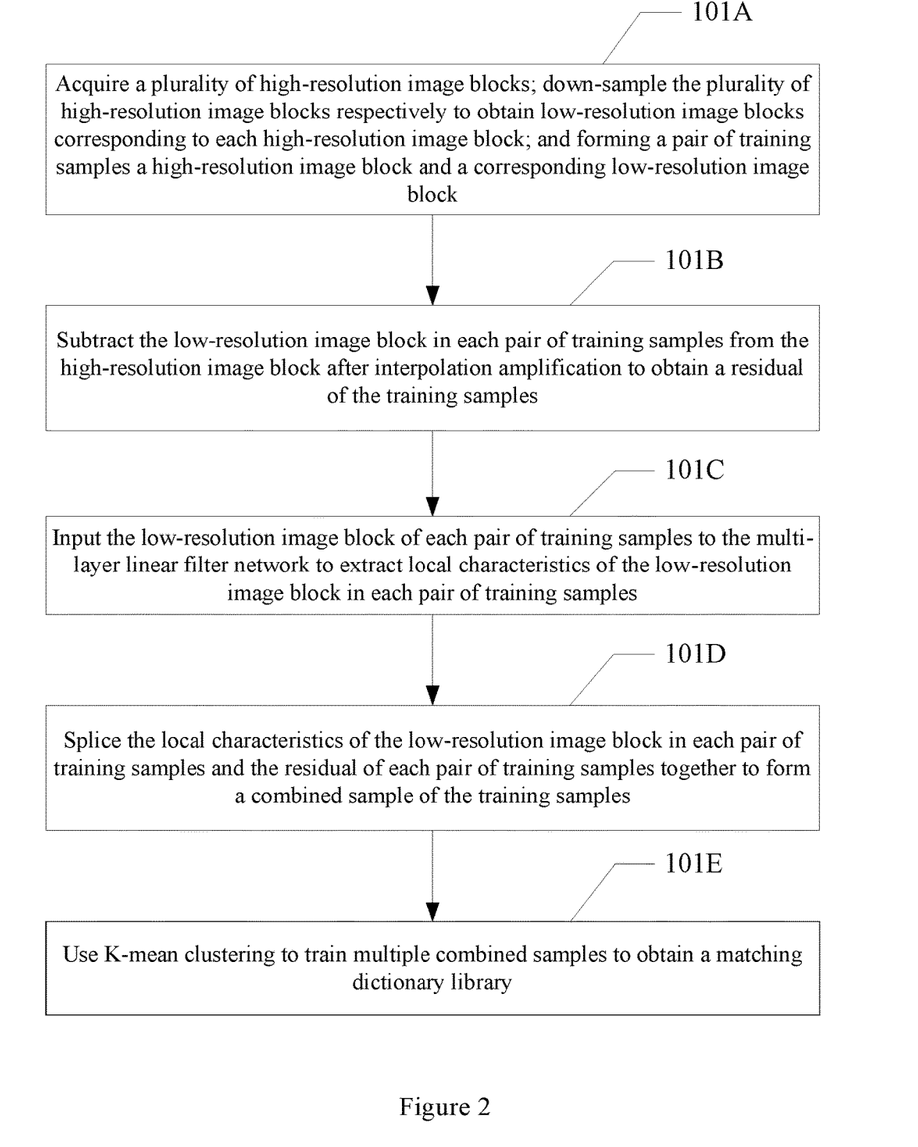
FIG. 2 is a flowchart for Step 101 in FIG. 1.

When establishing a matching dictionary library, a multi-layer linear filter network is also used to extract a local characteristic of low-resolution image blocks in some known samples for subsequent matching and utilization when the images are reconstructed according to the present invention. It can be understood that the known sample refers to a plurality of pre-acquired high-resolution image blocks and a corresponding plurality of low-resolution image blocks obtained after down-sampling the collected plurality of high-resolution image blocks for establishing a matching dictionary library. In some embodiments, referring to FIG. 2, Step 101 particularly includes the steps of:

Step 101A: acquiring a plurality of high-resolution image blocks; down-sampling the plurality of high-resolution image blocks respectively to obtain low-resolution image blocks corresponding to each high-resolution image block; and forming a pair of training samples using a high-resolution image block and the corresponding low-resolution image block.

Step 101B: subtracting the low-resolution image block in each pair of training samples from the high-resolution image block after interpolation amplification to obtain the residual of the training samples.

Step 101C: inputting the low-resolution image block of each pair of training samples into the multi-layer linear filter network to extract the local characteristic of the low-resolution image block of each pair of training samples.

Step 101D: splicing the local characteristic of the low-resolution image block of each pair of training samples and the residual of each pair of training samples together to form a combined sample of the training samples.

Step 101E: using K-mean clustering to train multiple combined samples to obtain a matching dictionary library.

In some embodiments, a total of 500,000 combined samples can be randomly selected from a known training image library, and a total of 1,024 combined samples are clustered from the above 500,000 samples by using a K-mean clustering algorithm. These 1,024 combined samples are used as atoms of the dictionary to constitute a matching dictionary.

Figure 3:
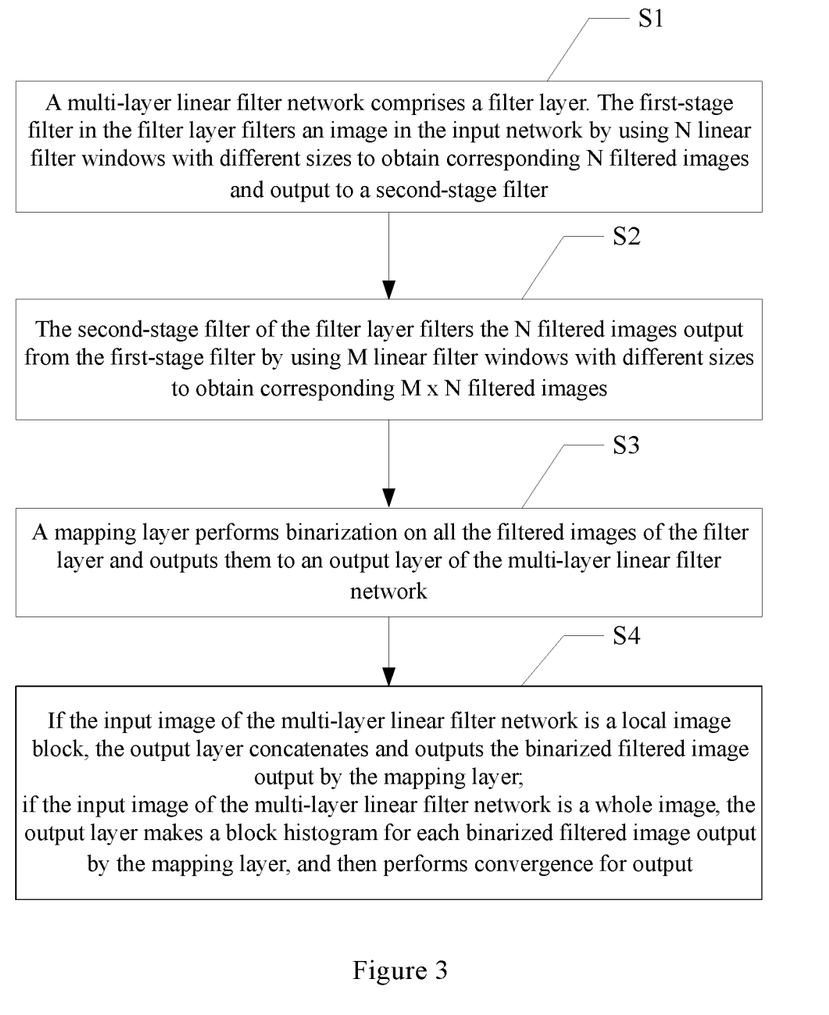
FIG. 3 is a schematic view of process for extracting a local characteristic of the image by a multi-layer linear filter network according to the present invention.

Wherein, referring to FIG. 3, the process for extracting a local characteristic of the image by a multi-layer linear filter network comprises the steps of:

Step S1: A multi-layer linear filter network comprises a filter layer. The first-stage filter of the filter layer filters the input image block by using N linear filter windows with different sizes to obtain corresponding N filtered images and output to the next stage filter.

The filtered image can include a line characteristic of the image, where N is an integer greater than one.

Step S2: the second-stage filter of the filter layer filters the N filtered images output from the first-stage filter by using M linear filter windows with different sizes to obtain corresponding M×N filtered images, wherein M is an integer greater than one.

Wherein according to the filtering process in Step S2, repeatedly outputting all the filtered images obtained by each stage filter to the next stage filter. The next stage filter filters all filtered images output from the previous stage filter by using multiple linear filter windows with different sizes, until filtering by the last stage filter is completed. All filtered images are output to the mapping layer of the multi-layer linear filter network. The number of repeated filtering is determined as required. Multiple stages of filters are pre-set.

Step S3: The mapping layer performs binarization on all the filtered images of the filter layer and outputs them to the output layer of the multi-layer linear filter network.

Step S4: If the input image of the multi-layer linear filter network is a local image block, the output layer concatenates and outputs the binarized filtered image output by the mapping layer, to obtain a local characteristic of the image; if the input image of the multi-layer linear filter network is a whole image, the output layer makes a block histogram for each binarized filtered image output by the mapping layer, and then performs convergence and output to obtain a local characteristic of the image.

The following is an example to further illustrate the present application.

Step 1: establishing a multi-layer linear filter network.

In the multi-layer linear filter network proposed in the present invention, linear filters in each direction with a bandwidth of one are used to extract linear characteristic of an image. The response of the linear filter is calculated by the following expression:

$$f(P_F) = \left| \min\left(\sum_{i,j \in L_k} L_k\right) \right| \quad k = 1, 2, \cdots N \quad (1)$$

where $P_F$ is the local image block of the filter window size. $L_k$ is the local line in the direction $k, (k=1,2, \ldots N)$ in the filter window. $(i,j)$ is the coordinates of the pixel point on the line $L_k$. Line $L_k$ is defined as follows:

$$L_k = \{(i,j): j = S_k(i-i_0) + j_0, i \in P_F\} \quad (2)$$

where $(i_0, j_0)$ is the coordinate of central pixel of the local block and $S_k$ is the slope of line $L_k$. This filter bank calculates the sum of the pixel values on lines in each direction within the filter window, and then selects the sum of the pixel values in the direction with the minimum value as the response of filters.

Figure 4:
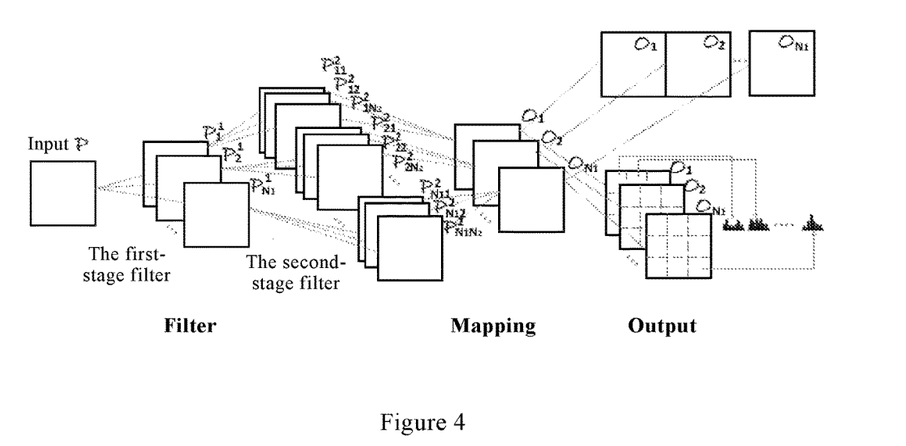
FIG. 4 is a schematic view of filtering process according to the present invention.

FIG. 4 illustrates the structure of a multi-layer linear filter network. The image P input into the network can be an entire image. The multi-layer linear filter network can be used to extract the global statistical characteristic. The image P input into the network can also be a local image block for extracting local characteristics. The network structure mainly consists of a filter layer, a mapping layer and an output layer.

The filter layer contains operation of multi stages of linear filters. This described example uses operation of two stages of linear filters. The first-stage filter filters the input P by using a total of N1 linear filters LF of different sizes:

$$p_i^1 = LF_i(P), i=1, 2, \ldots, N_1 \quad (3)$$

All results filtered in all windows in the first-stage filter are output to the next stage filter, that is, the second-stage filter. Where the output from the first-stage filter. The second-stage filter uses each output from the first-stage filter as input and filters by using a total of N2 linear filters of different sizes:

$$p_{ij}^2 = LF_j(p_i^1), j=1,2, \ldots, N_2 \quad (4)$$

where $p_{ij}^2$ is the output from the second-stage filter. Referring to FIG. 4, multi-stages of filtering can be repeated to obtain more filtered images. The filter network can be extended to higher levels.

The mapping layer follows the filter layer. The filter layer outputs a number of image characteristics obtained by the last filter to the mapping layer. The mapping layer performs binarization on each output from the filter layer, denoted by formula (5), and then a plurality of binarized outputs is combined into a mapped image:

LB is a local binarization operation, which is defined as follows:

$$LB(x) = \begin{cases} 1, \text{ if } x \geq \frac{1}{p}\sum_{p=1}^{P} x_p \\ 0, \text{ if } x < \frac{1}{p}\sum_{p=1}^{P} x_p \end{cases} \quad (5)$$

where x is the pixel point at the center of the current filter window and xp is the adjacent pixel point of the pixel.

The output layer is the last one. When the input P is an entire image, the entire image is divided into several local image blocks in the filter layer to obtain the filtered image of each local image block respectively. Thus, the output layer makes a block histogram for each output by the mapping layer, and then performs convergence to obtain a global statistical characteristic of the image P.

If the input P is a local image block, the output of the mapping layer is concatenated to obtain a local characteristic of the image.

The present application provides a method for super-resolution image reconstruction based on dictionary matching. The method comprises: establishing a matching dictionary library; inputting an image to be reconstructed into a multi-layer linear filter network; extracting a local characteristic of the image to be reconstructed; searching the matching dictionary library for a local characteristic of a low-resolution image block having the highest similarity with the local characteristic of the image to be reconstructed; searching the matching dictionary library for a residual of a combined sample where the local characteristic of the low-resolution image block with the highest similarity is located; performing interpolation amplification on the local characteristic of the low-resolution image block having the highest similarity; and adding the interpolation amplification result and the residual to obtain a reconstructed high-resolution image block. The local characteristic of the image to be reconstructed extracted by the multi-layer linear filter network has higher precision. Thus, a higher matching degree can be obtained during subsequent matching with the matching dictionary library, and the reconstructed image has a better quality. Therefore, the present invention can greatly improve the quality of the high-resolution image to be reconstructed.

Figure 5:
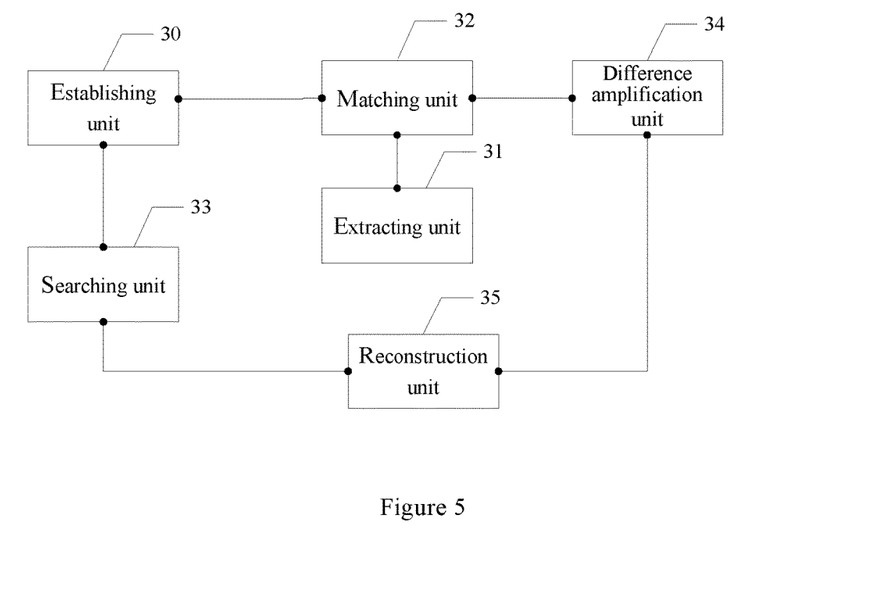
FIG. 5 is a block diagram of a device for super-resolution image reconstruction based on dictionary matching according to the present invention.

Implementation Example 2:

Referring to FIG. 5, the present application provides a device for super-resolution image reconstruction based on dictionary matching, which includes: an establishing unit 30 that can establish a matching dictionary library, and further comprising:

An extracting unit 31 that can input an image block to be reconstructed into a multi-layer linear filter network, and extracting a local characteristic of the image block to be reconstructed;

A matching unit 32 that can search the matching dictionary library for a local characteristic of a low-resolution image block having the highest similarity with the local characteristic of the image to be reconstructed;

A searching unit 33, searching the matching dictionary library for a residual of a combined sample where the local characteristic of the low-resolution image block with the highest similarity is located;

A difference amplification unit 34 that can perform interpolation amplification on the local characteristic of the low-resolution image block having the highest similarity; and A reconstruction unit 35 that can add the local characteristic of the low-resolution image block amplified by difference amplification unit 34 and the residual found by the searching unit to obtain a reconstructed high-resolution image block.

Figure 6:
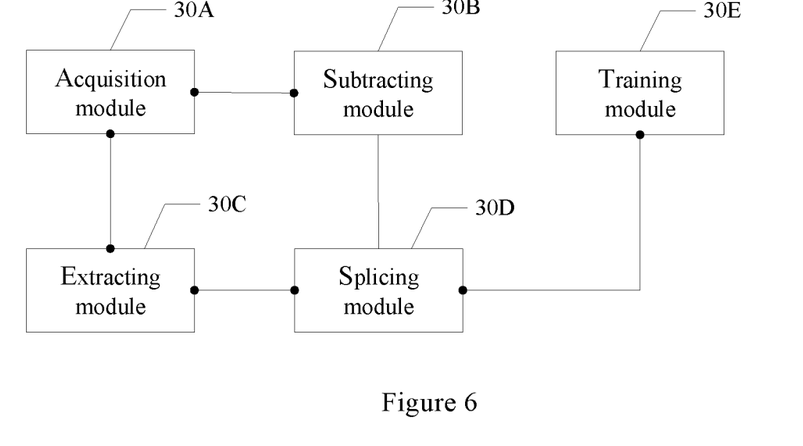
FIG. 6 is a schematic view of the establishing unit in FIG. 5.

Referring to FIG. 6, in some embodiments, the establishing unit 30 particularly comprises:

An acquisition module 30A that can acquire a plurality of high-resolution image blocks; down-sampling the plurality of high-resolution image blocks respectively to obtain low-resolution image blocks corresponding to each high-resolution image block; and a high-resolution image block and the low-resolution image block corresponding to the high-resolution image block constitute a pair of training samples;

A subtracting module 30B that can subtract the low-resolution image block in each pair of training samples from the high-resolution image block after interpolation amplification to obtain the residual of the training samples;

An extracting module 30C that can input the low-resolution image block of each pair of training samples into the multi-layer linear filter network to extract the local characteristic of the low-resolution image block of each pair of training samples;

A splicing module 30D that can splice the local characteristic of the low-resolution image block of the each pair of training samples and the residual of the pair of training samples together to form a combined sample of the training samples; and A training module 30E that can use K-mean clustering to train multiple combined samples to obtain a matching dictionary library.

Figure 7:
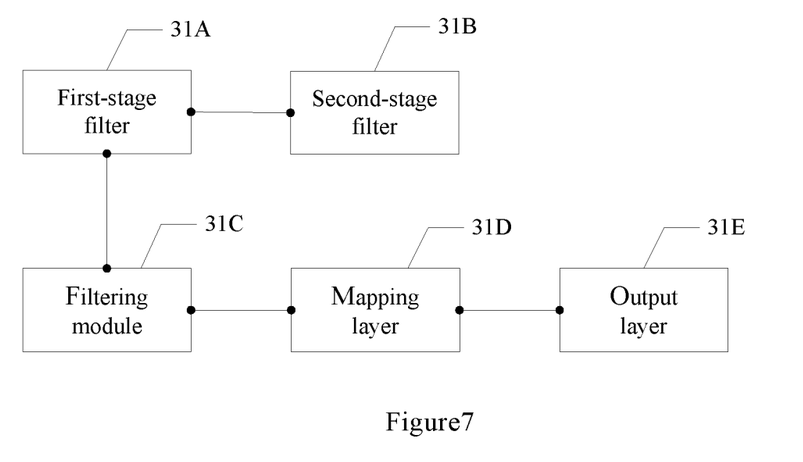
FIG. 7 is a schematic view of the extracting unit in FIG. 5.

Referring to FIG. 7, in some embodiments, the extracting unit 31 particularly comprises:

a first-stage filter 31A that can filter the input image block to be reconstructed by using N linear filter windows with different sizes to obtain corresponding N filtered images and output to the next stage filter, wherein the filtered image comprises: a line characteristic of the image, where N is an integer greater than one;

a second-stage filter 31B that can filter the N filtered images output from the first-stage filter by using M linear filter windows with different sizes to obtain corresponding M×N filtered images, where M is an integer greater than one;

a filtering module 31C that can output all the filtered images obtained by each stage filter to the next stage filter repeatedly. The next stage filter filters all filtered images output from the previous stage filter by using multiple linear filter windows with different sizes, until filtering by the last stage filter is completed. All filtered images are output to the mapping layer of the multi-layer linear filter network;

a mapping layer 31D that can perform binarization on all the filtered images of the filter layer and outputting them to the output layer of the multi-layer linear filter network; and an output layer 31E that can concatenate and output the binarized filtered image output by the mapping layer, to obtain a local characteristic of the input image block to be reconstructed.

The filtering process of each filter window is as follows:

Each filter window with preset size performs linearly filtering of pixel $(i_0, j_0)$ of the image in the middle of the filter window by using a plurality of linear filters in different directions in the window, using a response formula as follows:

$$f(P_F) = \left| \min\left( \sum_{i,j \in L_k} L_k \right) \right| \quad k = 1, 2, L\ N$$

where $P_F$ is the local image block of the filter window size. $L_k$ is the local line in the direction $k, (k=1, 2, \ldots N)$ in the filter window. $(i,j)$ is the coordinates of the pixel point on the line $L_k$. Line $L_k$ is defined as follows:

$$L_k = \{(i,j): j = S_k(i - i_0) + j_0, i \in P_F\}$$

where $S_k$ is the slope of line $L_k$.

The above contents are further detailed description of the present invention in connection with the disclosed embodiments. The invention is not limited to the embodiments referred to, but may be varied and modified by those skilled in the field without departing from the idea and scope of the present invention.

What is claimed is:

1. A method of super-resolution image reconstruction based on dictionary matching, wherein comprising:
    establishing a matching dictionary library;
    inputting an image block to be reconstructed into a multi-layer linear filter network, and extracting a local characteristic of the image to be reconstructed;
    searching the matching dictionary library for a local characteristic of a low-resolution image block having highest similarity with the local characteristic of the image block to be reconstructed, wherein the step for extracting a local characteristic of the image comprises:
        Step 1: wherein a multi-layer linear filter network comprises a filter layer, filtering an input image block to be reconstructed by a first-stage filter of the filter layer using N linear filter windows with different sizes to obtain corresponding N filtered images and output to the next stage filter, wherein the filtered image includes a line characteristic of the image, where N is an integer greater than one;
        Step 2: filtering the N filtered images output from the first-stage filter by a second-stage filter of the filter layer using M linear filter windows with different sizes to obtain corresponding M×N filtered images, where M is an integer greater than one;
        Step 3: outputting all the filtered images obtained by each stage filter to a next stage filter repeatedly; filtering all filtered images output from the previous stage filter by the next stage filter using multiple linear filter windows with different sizes until filtering by the last stage filter is completed; outputting all filtered images to the mapping layer of the multi-layer linear filter network;
        Step 4: performing binarization on all the filtered images of the filter layer by the mapping layer to output to the output layer of the multi-layer linear filter network; and Step 5: if the input image of the multi-layer linear filter network is a local image block, concatenating and outputting, by the output layer, the binarized filtered image output by the mapping layer to obtain a local characteristic of the image; if the input image of the multi-layer linear filter network is a whole image, making, by the output layer, a block histogram for each binarized filtered image output by the mapping layer, and then performing convergence for output to obtain a local characteristic of the image;

searching the matching dictionary library for a residual of a combined sample in which the local characteristic of the low-resolution image block having the highest similarity is located; and performing interpolation amplification on the local characteristic of the low-resolution image block having the highest similarity, and adding the residual to a result of the interpolation amplification to obtain a reconstructed high-resolution image block.

2. The method of claim 1, wherein the step of establishing a matching dictionary library comprises:

acquiring a plurality of high-resolution image blocks; down-sampling the plurality of high-resolution image blocks respectively to obtain low-resolution image blocks respectively corresponding to the high-resolution image blocks; and forming a pair of training samples using a high-resolution image block and the corresponding low-resolution image block;

subtracting the low-resolution image block in each pair of training samples from the high-resolution image block after the step of interpolation amplification to obtain a residual for the pair of training samples;

inputting the low-resolution image block of each pair of training samples into the multi-layer linear filter network to extract the local characteristic of the low-resolution image block of each pair of training samples;

splicing the local characteristic of the low-resolution image block of the each pair of training samples and the residual for the pair of training samples together to form the combined sample of the training samples; and using K-mean clustering to train multiple combined samples to obtain a matching dictionary library.

3. The method of claim 1, wherein the steps of filtering comprise:

for each filter window with a preset size, performing linear filtering of pixel $(i_0,j_0)$ of the image in middle of the filter window by using linear filters in different directions using a response formula as follows:

$$f(P_F) = \left| \min\left(\sum_{i,j \in L_k} L_k\right) \right| \quad k = 1, 2, L\, N \tag{1}$$

where $P_F$ is the local image block of size of the filter windows, $L_k$ is a local line in direction k, (k =1,2, ... N) in the filter window, (i,j) is coordinates of a pixel point on line $L_k$, wherein line $L_k$ is defined as follows:

$$L_k = \{(i,j): j = S_k(i-i_0)+j_0, i \in P_F\} \tag{2}$$

where $S_k$ is the slope of line $L_k$.

4. The method of claim 3, wherein Step 4 comprises: performing binarization on the filtered images using:

$$LB(x) = \begin{cases} 1, \text{ if } x \geq \frac{1}{p}\sum_{p=1}^{P} x_p \\ 0, \text{ if } x < \frac{1}{p}\sum_{p=1}^{P} x_p \end{cases} \tag{3}$$

where x is a pixel point in middle of the current filter window, and $x_p$ is an adjacent pixel point of the pixel.

5. The method of claim 1, wherein the steps of inputting an image block to be reconstructed into a multi-layer linear filter network, and extracting a local characteristic of the image to be reconstructed comprise:

Step 1: wherein a multi-layer linear filter network comprises a filter layer, filtering an input image block to be reconstructed by a first-stage filter of the filter layer using N linear filter windows with different sizes to obtain corresponding N filtered images and output to the next stage filter, wherein the filtered image includes a line characteristic of the image, where N is an integer greater than one;

Step 2: filtering the N filtered images output from the first-stage filter by a second-stage filter of the filter layer using M linear filter windows with different sizes to obtain corresponding M×N filtered images, where M is an integer greater than one;

Step 3: outputting all the filtered images obtained by each stage filter to a next stage filter repeatedly; filtering all filtered images output from the previous stage filter by the next stage filter using multiple linear filter windows with different sizes until filtering by the last stage filter is completed; outputting all filtered images to the mapping layer of the multi-layer linear filter network;

Step 4: performing binarization on all the filtered images of the filter layer by the mapping layer to output to the output layer of the multi-layer linear filter network; and Step 5: concatenating and outputting, by the output layer, the binarized filtered image output by the mapping layer to obtain a local characteristic of the input image block to be reconstructed.

\* \* \* \* \*